March 29, 1966   W. C. LOUDEN ETAL   3,243,635
CERAMIC LAMP CONSTRUCTION
Filed Dec. 27, 1962
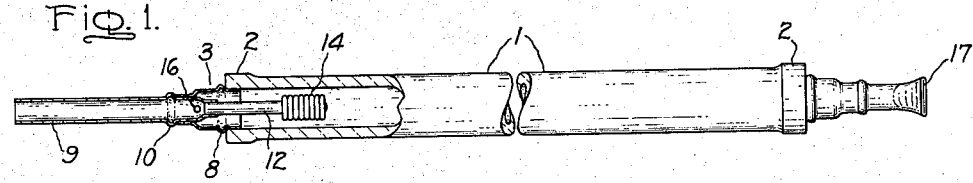
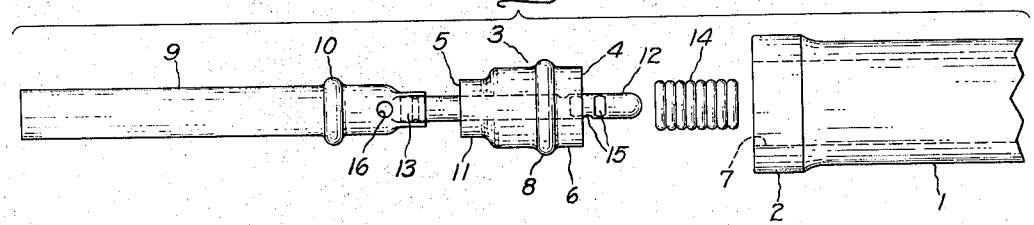
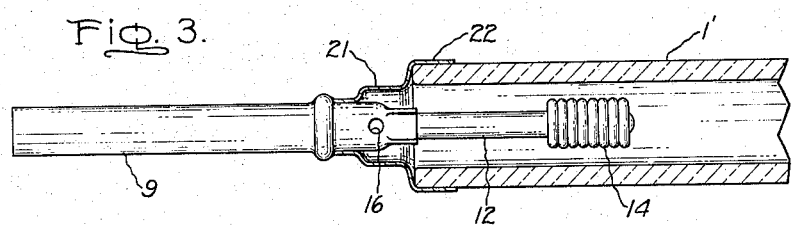
Inventors:
William C. Louden
Richard S. Pinter
by Ernest W. Legros
Their Attorney United States Patent Office
3,243,635
Patented Mar. 29, 1966

3,243,635
CERAMIC LAMP CONSTRUCTION
William C. Louden, South Euclid, Ohio, and Richard S. Pinter, Pittsfield, Mass., assignors to General Electric Company, a corporation of New York
Filed Dec. 27, 1962, Ser. No. 247,583
4 Claims. (Cl. 313—317)

This invention relates to a ceramic lamp and more particularly to the seal and inlead or closure of such a lamp.

Envelopes of high density transparent polycrystalline alumina are particularly suitable for alkali metal vapor discharge lamps because this material can successfully withstand the attack of these metal vapors even at high temperatures. Examples of such lamps are cesium and sodium vapor lamps and other metal vapor lamps disclosed in Patent 2,971,110, Schmidt, "Metal Vapor Lamps." The material is also suitable for high pressure and high temperature gaseous discharge lamps in general, such as for instance xenon arc lamps.

A persistent problem with ceramic lamps has been the satisfactory sealing of the ends of the tubes. This is particularly the case with alkali metal vapor lamps such as sodium lamps operating at relatively high temperatures, since the seals must likewise be capable of withstanding the alkali metal vapor. One form of seal for an alumina ceramic lamp is described in copending application Serial No. 836,201, filed August 26, 1959 of William C. Louden and Elmer Homonnay, entitled "Ceramic-to-Metal Seal" and assigned to the same assignee as the present invention, now Patent 3,088,201.

The object of the invention is to provide an improved form of end closure for a ceramic lamp, particularly suitable for an alumina ceramic lamp and having good resistance to attack by alkali metal vapors.

In accordance with our invention, the envelope of a ceramic such as alumina has a tubular end closed by an end cap having a metal sleeve portion with a coefficient of thermal expansion approximating that of the alumina ceramic. For an alkali metal vapor lamp, the metal sleeve material must also be resistant to the alkali metal vapor. The sleeve of the cap makes a close fit with the end of the envelope upon axial insertion; it may fit either within the end of the envelope or around it. In either case it is sealed to the envelope by a thin layer of glassy material preferably having a thickness in the range of capillary attraction. The glassy material is resistant to alkali metal vapor attack and is sandwiched between the mating surfaces of the envelope and of the metal sleeve portion and is bonded to both surfaces. Preferably the sleeve is thin-walled to provide an elastic closure that will give slightly in the event of slight mismatch in expansion relative to the alumina ceramic in the operating temperature range. The metal sleeve material must have a melting point higher than the flowing temperature of the glassy material, suitably 1450° C. or higher. For an alumina ceramic sodium vapor lamp, the metals which meet the foregoing requirements are, in order of preference or suitability, niobium, tantalum, and molybdenum.

A feature of our invention is the use of a circumferential glassy sealing layer extending an appreciable length in the direction of the envelope axis. This reduces considerably the risk of any leakage occurring between the cap and the envelope by comparison with prior type seals wherein a flat disc or closure member is merely bonded to the end of the envelope. In the latter case, the effective possible leakage path through the seal is determined by the thickness of the envelope wall, whereas according to our present invention, it can be made several times the wall thickness.

The use of an appropriate glassy material as the bonding agent simplifies the sealing of the cap to the envelope. A layer of the glassy sealing material may first be sintered to the surface of the metal sleeve in an inert gas atmosphere. Since the sleeve fits closely either within or around the end of the alumina ceramic tube, the glassy material is drawn up by capillary action into the annular space between the sleeve portion and the envelope during the formation of the seal and completely fills the annular space. The glassy material preferably consists of a eutectic mixture of aluminum oxide and calcium oxide or of aluminum oxide, calcium oxide and magnesium oxide.

The cap preferably consists of a thimble or cup-shaped piece of niobium, this material having a coefficient of thermal expansion closely matching that of polycrystalline alumina. Preferably a metal tube, likewise of niobium, extends through each end cap. These tubes are used for flushing gas through the envelope or for exhausting and gas filling the envelope. The outer ends of the tubes may be closed by pinching or in any other convenient manner. The inner ends of the tubes projecting within the envelope provide supports for the electrodes and the tubes themselves constitute the electrode lead-in conductors.

The features of the invention believed to be novel are set forth in the claims appended hereto. The invention however will be better understood from a consideration of the following detailed description and the accompanying drawing wherein:

FIG. 1 illustrates an alumina ceramic discharge lamp sectioned at one end to illustrate the closure or end seal embodying the invention.

FIG. 2 is an exploded view to a larger scale of the parts forming the end seal structure.

FIG. 3 illustrates a variant in cap construction for the end seal.

Referring to FIGS. 1 and 2, the illustrated lamp comprises an envelope 1 of ceramic tubing of sintered transparent polycrystalline alumina. The material has a very high alumina content, suitably in excess of 99.5% $Al_2O_3$, and may be prepared in the manner described in Patent 3,026,210, Coble "Transparent Alumina and Method of Preparation." By way of dimensional example, in a high pressure sodium vapor alumina lamp, the tubing may be 8.5 centimeters in over-all length by 6 millimeters in internal diameter. The wall thickness may be approximately 0.8 millimeter; for greater strength, the ends are belled or shouldered by increasing the outside diameter as indicated at 2 with the resulting wall thickness being about 1.4 millimeters, but this is not essential.

The end closure comprises a thimble or cap-like member 3 of niobium which is fully open at its front end 4 and has a reduced diameter opening at its rear end 5. The front metal sleeve portion 6 is proportioned to fit into the end of the alumina tube with a radial clearance relative to the inside surface 7 sufficient to allow the sleeve to penetrate easily as the glassy material begins to flow, but small enough that capillary action retains a thin layer of glass between the mating surfaces. In practice, a radial clearance .001″ to .002″ is adequate for easy penetration while achieving the desired capillary action. The upset shoulder 8 in the thimble limits the depth of penetration and increases flexibility. A niobium exhaust tube 9 penetrates the thimble up to the upset shoulder 10 and is brazed or welded to the rear sleeve portion 11 of the thimble. The electrode proper comprises a rod or stud 12 of thoriated tungsten which is crimped and welded at 13 into the exhaust tube. A tungsten coil 14 is slipped or screwed over the front end of the stud and fits snugly thereon. Four lateral slots 15 spaced angularly and axially on the stud provide cavities which accommodate emission material and are shielded by the coil. It is of course possible to use some other form of energy translation element than an electrode, for instance a filament; such element may be crimped or attached in similar fashion to the exhaust tube at 13.

The exhaust tube 9 is provided with a lateral aperture at 16 just behind the crimp 13 but forward of the weld to the rear sleeve 11 of the thimble. This provides a passageway through which the envelope may be evacuated and the sodium and rare gas filling introduced. If it is desired to flush gas right through the envelope, an aperture is provided in both exhaust tubes. Otherwise, the aperture need be provided in only one exhaust tube and the other tube is then a dummy which need not be crimped in order to seal the envelope. Where an aperture is provided, the exhaust tubes may be closed by pinching in a cold weld as indicated at 17, or in any other suitable manner. Alternatively, where an exhaust tube is not needed, one may use a closed niobium thimble and weld the electrode stud directly to the end wall of the thimble.

The procedure in making the end closure may be as follows. First the stud 12 is crimped and welded into the end of the exhaust tube 9. The thimble 3 is then welded to the exhaust tube, the welding being done either in a vacuum or in an inert gas atmosphere. The stud is then dipped into a suitable emission mix, for instance a suspension of materials consisting of alkaline earth oxides or interoxides, or materials decomposable upon heat treatment to form such oxides or interoxides preferably including barium metal. The helix or coil 14 is next slipped over the stud and the stud with coil thereon may again be dipped into the emission mix and subjected to the necessary heat treatment depending upon the nature of the material. A preferred activating material consists of a suspension of barium thorate with added thorium, or barium zirconate with added zirconium, in a comparatively volatile organic liquid such as butyl acetate or ethyl alcohol. The activation of the material occurs upon heating to a temperature exceeding about 800° C. and this may occur merely as a result of sealing the end closure to the alumina envelope.

For the actual sealing of the thimble 3 to the end of the alumina tube, the surface of the sleeve portion 6 is first sandblasted or liquid-honed to increase the surface area. A layer of glassy sealing material is sintered to the sealing surface. A suitable material is a eutectic or near-eutectic mixture comprising mainly aluminum oxide and calcuim oxide and having a flow point or melting point above 1400° C.; a preferred material consists of 49% $Al_2O_3$, 45% CaO, and 6% MgO by weight, and an alternative consists of approximately equal parts of $Al_2O_3$ and CaO. Other suitable materials are disclosed in copending application Serial No. 158,797, filed December 12, 1961, of John F. Ross entitled, "Ceramic Bonding," and assigned to the same assignee as the present invention. The glassy material which has been prefired and then ground to a fine powder is applied as a suspension in a suitable liquid such as nitrocellulose in butyl acetate or a 1% polyox (polyethylene oxide) solution in water. A thin layer is brushed on the sleeve portion, dried, then fired at a temperature of about 1450° C. in vacuum to provide a layer about .0005 inch thick. A second layer of the glassy material powder is brushed on and the end closure assembly is then joined to the alumina bulb by firing in a vacuum at a temperature in the range of 1400 to 1450° C., the metal sleeve being pressed home into the end of the alumina tube as the glassy layer melts. A suitable firing schedule is to fire at 1400° C. for three minutes, at 1350° C. for three minutes, at 1250° C. for three minutes, and at 1050° C. for three minutes, and finally cooling to room temperature, all the time in a vacuum. The glassy coating is liquified during the sealing and is drawn up by capillary action into the annular space between the inside surface of the alumina envelope and the outside surface of sleeve portion 6 of the thimble. Upon cooling, the glassy material bonds to both the niobium metal of the thimble and the alumina of the envelope. Both seals are preferably formed at the same time in a single operation. To complete the lamp, an ionizable filling comprising an alkali metal such as sodium, and an inert gas such as xenon is introduced into the envelope, and the ends of the tubes 9 are closed by pinching in a cold weld, as indicated at 17.

FIG. 3 illustrates a variant of the invention using a niobium thimble 21 which is provided with an expanded skirt portion 22 proportioned to fit around the end of the alumina tube 1' rather than within it. In such case the wall thickness of the alumina tube is made uniform right up to the end and is not expanded as in the case of FIG. 1. The skirt 22 of the thimble is sealed to the end of the alumina tube using a sealing glass mixture within the annular space in similar fashion to what has already been described.

The embodiments of the invention which have been illustrated and described in detail are intended as illustrative and not in order to limit the invention thereto. The scope of the invention is to be determined by the appended claims which are intended to cover any modifications falling within its spirit.

What we claim as new and desire to secure by Letters Patent of the United States is:

1. An alumina ceramic electric discharge device comprising a high density polycrystalline alumina tube having end closures each including a niobium thimble having a thin-walled tubular sleeve portion forward of an expanded shoulder and dimensioned to fit snugly upon axial insertion into the end of said tube up to said shoulder, a thin annular layer of glassy material between said alumina tube and said sleeve portion and bonded to both, a niobium exhaust tube penetrating said thimble and fastened to a reduced diameter rearward sleeve extension thereof, an electrode fastened to the forward end of said exhaust tube, at least one of said end closures having an aperture in its exhaust tube forward of the attachment to the thimble, said aperture providing a passageway into said alumina tube.

2. An alkali metal vapor alumina ceramic lamp comprising a high density polycrystalline alumina tube having end closures each including a niobium thimble having a thin-walled tubular sleeve portion forward of an expanded shoulder and dimensioned to fit snugly upon axial insertion into the end of said tube up to said shoulder, a thin annular layer of glassy material resistant to the attack of alkali metal vapor between said alumina tube and said sleeve portion and bonded to both, a niobium exhaust tube penetrating said thimble and fastened to a reduced diameter rearward sleeve extension thereof, an electrode comprising a tungsten stud with a slip-over coil on the forward end thereof, said stud being fastened into the forward end of said exhaust tube, at least one of said end closures having an aperture in its exhaust tube to the rear of said stud attachment but forward of the attachment to the thimble, said aperture providing a passageway into said alumina tube, and an ionizable filling within said tube comprising an alkali metal and an inert gas.

3. An alkali metal vapor alumina ceramic lamp comprising a high density polycrystalline alumina tube having end closures each including a niobium thimble having a thin-walled tubular sleeve portion forward of an expanded shoulder and dimensioned to fit snugly upon axial insertion into the end of said tube up to said shoulder, a thin annular layer of glassy material comprising a near-eutectic mixture including mainly aluminum oxide and calcium oxide and having a flow temperature above 1400° C. between said alumina tube and said sleeve portion and bonded to both, a niobium exhaust tube penetrating said thimble and joined by a weld to a reduced diameter rearward sleeve extension thereof, an electrode comprising a tungsten stud with a slip-over coil on the forward end thereof, said stud being fastened into the forward end of said exhaust tube, at least one of said end closures having an aperture in its exhaust tube to the rear of said stud attachment but forward of the weld to the thimble, said aperture providing a passageway into said alumina tube, and an ionizable filling within said tube comprising an alkali metal and an inert gas, the apertured exhaust tube being closed by a cold weld juncture.

4. An alumina ceramic electric discharge device comprising a high density polycrystalline alumina tube having end closures each including a niobium thimble having a body portion and an expanded forward skirt portion proportioned to fit closely around the end of said tube and extending axially thereover, a thin annular layer of glassy material between said alumina tube and said skirt portion and bonded to both, a niobium exhaust tube penetrating said thimble and fastened to a reduced diameter rearward sleeve extension thereof, an electrode fastened to the forward end of said exhaust tube, at least one of said end closures having an aperture in its exhaust tube forward of the attachment to the thimble, said aperture providing a passageway into said alumina tube.

References Cited by the Examiner
UNITED STATES PATENTS

| | | |
|---|---|---|
| 2,200,694 | 5/1940 | Gerecke et al. |
| 2,647,070 | 7/1953 | Litton. |
| 2,708,774 | 5/1955 | Seelen _____ 161—196 |
| 2,815,474 | 12/1957 | Lewis et al. _____ 317—236 |
| 2,971,110 | 2/1961 | Schmidt _____ 313—227 |
| 2,972,808 | 2/1961 | Litton. |
| 3,036,675 | 5/1962 | Benichou. |
| 3,065,533 | 11/1962 | Dungan et al. |
| 3,166,396 | 1/1965 | Miller et al. _____ 65—43 X |
| 3,167,438 | 1/1965 | Bristow _____ 106—46 |

OTHER REFERENCES

Van Vlack: Elements of Materials Science, Addison-Wesley Publishing Co., Inc., Reading, Mass., 1959, page 473.4.

Kohl: Materials and Techniques for Electron Tubes, Reinhold Publishing Corp., N.Y., 1960, page 352.

GEORGE N. WESTBY, *Primary Examiner.*

R. JUDD, *Assistant Examiner.*